United States Patent [15] 3,636,675
Hellerich [45] Jan. 25, 1972

[54] ARTICLE OF MANUFACTURE

[72] Inventor: Walter Hellerich, Heilbronn, Germany

[73] Assignee: Arbed S.A., Arbed-Felten & Guilleaume Vereinigte Drahtwerke, Mulheim, Germany

[22] Filed: Feb. 18, 1970

[21] Appl. No.: 12,266

[30] Foreign Application Priority Data

Mar. 6, 1969 Germany .......................P 19 11 389.4

[52] U.S. Cl. ..............................................................52/659
[51] Int. Cl. .........................................................E04c 5/00
[58] Field of Search ............................................52/659, 663

[56] References Cited

UNITED STATES PATENTS 1,008,209  11/1911  Skinner.............................52/659 X Primary Examiner—Richard J. Scanlan, Jr.
Attorney—Michael S. Striker

[57] ABSTRACT

A metallic reinforcing structure is embedded in a synthetic plastic plate and comprises a central disc-shaped portion and a plurality of elongated metallic wires projecting radially outwardly from the disc-shaped portion. Male and female threaded members are provided on the disc-shaped portion such that stresses entering from the former into the disc-shaped portion are uniformly transmitted into the synthetic plastic plate via the metallic wire.

14 Claims, 4 Drawing Figures

INVENTOR.
WALTER HELLERICH
BY
ATTORNEY

3,636,675

ARTICLE OF MANUFACTURE

BACKGROUND OF THE INVENTION

The present invention relates to a reinforced structure of a synthetic plastic element and a reinforcement embedded in the element.

Constructionwise, synthetic plastic elements, oftentimes, present considerable difficulties at those places thereof where exterior forces are to enter the elements.

Attempts have been made to reinforce the synthetic plastic elements at those "force-entering" places by means of reinforcing structures such as reinforced lateral marginal portions, superimposed corrugations or reinforcing structures embedded in the elements.

However, such reinforcing structures, on the whole, cannot prevent the occurrence of surface cracks in the surfaces of the elements, which takes place as a result of high forces locally applied to these surfaces.

More in particular, such surface cracks cannot be avoided at all when the load per unit surface is relatively high as a result of screw or rivet connections.

In addition, the use of metallic reinforcing structures embedded in the synthetic plastic elements merely effects the absorption of the high local surface loads applied to the surfaces of the elements, however, the transmission of these loads or forces from the embedded reinforcement into the surrounding synthetic plastic element, can hardly be realized.

SUMMARY OF THE INVENTION

Object of the present invention is to overcome the above disadvantages and to provide a novel reinforced structure in which the forces are uniformly dispersed over the synthetic plastic element.

Such a novel article of manufacture comprises an element of synthetic plastic material with a reinforcing structure embedded in the element, the reinforcing structure comprises a first portion having a peripheral margin and a plurality of elongated flexible second portions projecting from the peripheral margin in stress-transmitting relationship with the first portion. Connecting means are provided for connecting the first portion and thereby the element in stress-transmitting relationship with a load so that stresses entering from the latter into the first portion are uniformly transmitted into the element of synthetic plastic material via the second portions.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
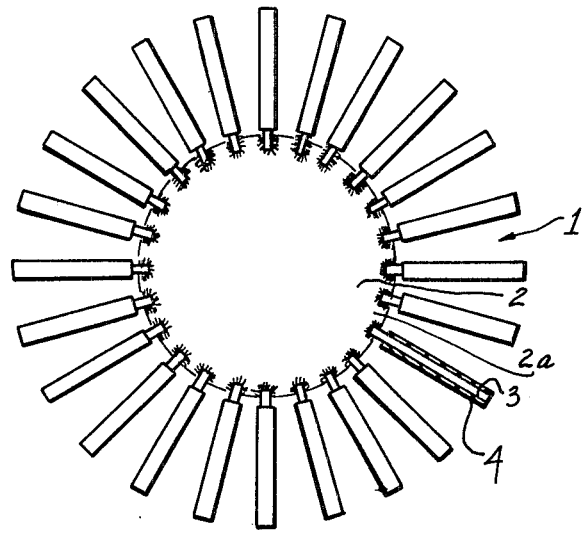
FIG. 1 illustrates the reinforcing structure embodied according to the present invention and to be embedded in a synthetic plastic element to reinforce the same.

Referring now to the drawings in which like reference numerals index like parts, the reinforcing structure of FIG. 1 and generally indicated at 1, is seen to comprise a central core constituted, in this embodiment, by a substantially disc-shaped member 2 which, along its peripheral margin 2a, is provided with a plurality of substantially rod-shaped projections 3 which project radially outwardly from the disc-shaped member 2.

Both the disc-shaped member 2 and the projections 3 are metallic members and, preferably, are made of steel.

However, any suitable metallic material other than steel may be used to constitute the element 2 and the projections 3.

The projections 3, in this embodiment, are welded to the peripheral margin 2a of the disc-shaped member 2, however, the projections may equally well be unitary with the peripheral margin or be connected thereto in any other suitable manner.

In the preferred embodiment, the projections 3 actually are constituted by metallic wires and are coated with a layer of synthetic plastic material, preferably consisting at least in part of phenoxy resin.

Figure 2:
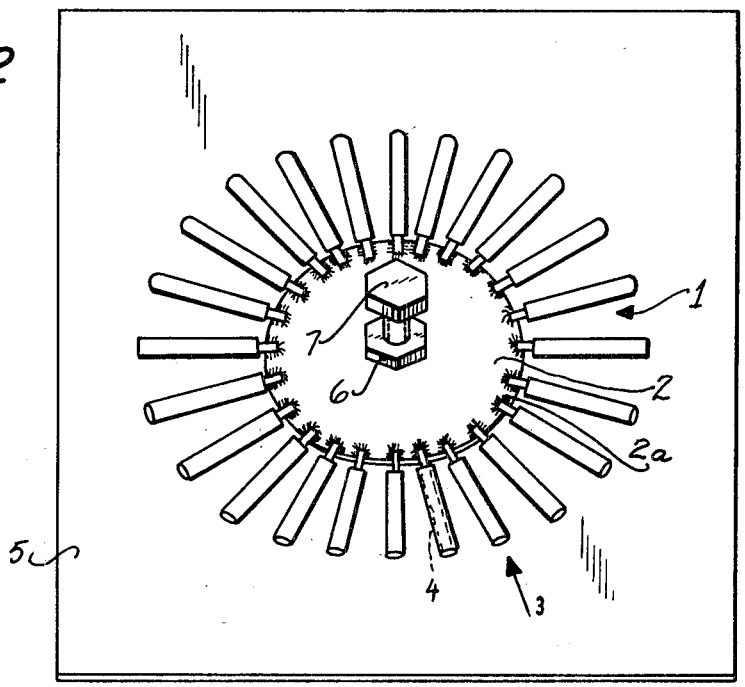
FIG. 2 illustrates the embodiment of FIG. 1, embedded in a synthetic plastic element.

FIG. 2 illustrates the reinforcing structure 1 as to be centrally embedded in a plate-shaped synthetic plastic element 5 which is reinforced with glass fibers.

In this condition, the disc-shaped member 2 is centrally provided with a nut member 6 and a screw member 7, threadably received in the former.

The thus-constituted reinforced structure consisting of the synthetic plastic element 5, the disc-shaped member 2 with the projections 3 and the coatings 4, and the male and female threaded members 6 and 7, permits forces applied to the threaded members 6 and 7 and transmitted from the same onto the disc-shaped member 2, to be uniformly dispersed over the entire synthetic plastic element 5 via the plurality of radial projections 3.

The projections 3, preferably, have a diameter of 0.6 mm. and each of the projections is capable of transmitting a force of the magnitude of about 60 kilopounds from the central disc-shaped member 2 into the surrounding synthetic plastic element 5.

The advantages obtained with the subject embodiment are, in particular, characterized (a) by a high adhesive strength between the reinforcing element 1 and the surrounding synthetic plastic element 5 as a result of the synthetic plastic layer on the projections 3; (b) by a substantial increase in the dynamic strength of the synthetic plastic element 5 as a result of the high elasticity modulus of the wire projections 3; (c) by a comparatively economical production of the reinforced structure; (d) by a reduction in electrostatic electricity accumulated on the synthetic plastic element; and (e) by the fact that the reinforcing structure may also be used and embedded in an arcuately shaped or curved synthetic plastic element.

It is advantageous that the disc-shaped member is provided with the exemplary nut and screw members 6 and 7 which enable the reinforced structure to be easily connected to a given load, for example, the reinforced structure as shown in FIG. 2 may be used as a side panel of a radio, or the like, and a handle for lifting the radio may have a threaded male member which replaces the screw member 7 and which, in the place of the latter, can easily be accommodated in the threaded female member 6.

Of course, the fields of application of the reinforced structure of FIG. 2 are numerous.

Figure 3:
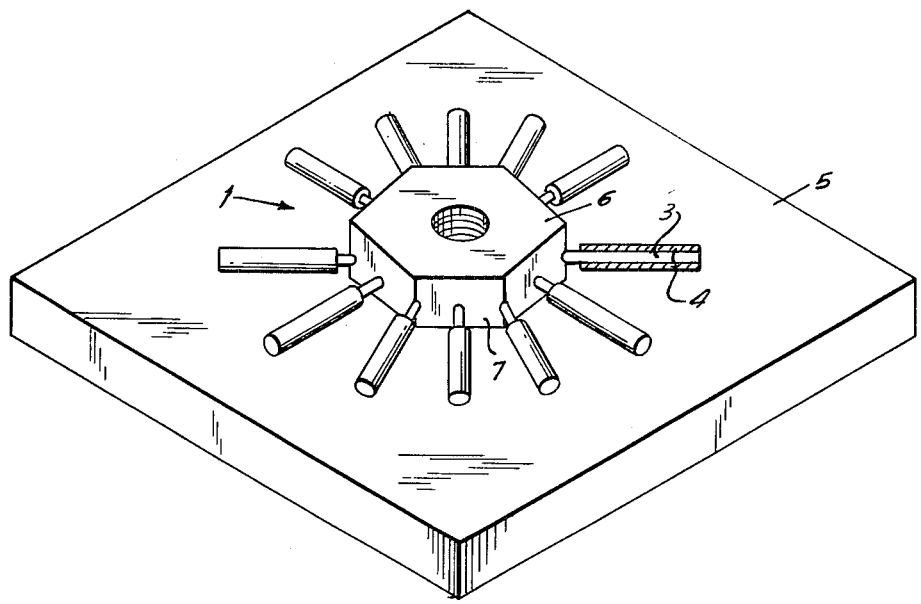
FIG. 3 illustrates a modified reinforcing structure embedded in a synthetic plastic element.

In alternative embodiments, the disc-shaped member 2 may have a central threaded recess which replaces the nut 6, or the disc-shaped member 2, as a whole, may be replaced by a nut 6 in which case the projections 3 are directly connected to the polygonal circumference 7 of the nut as shown in FIG. 3.

Figure 4:
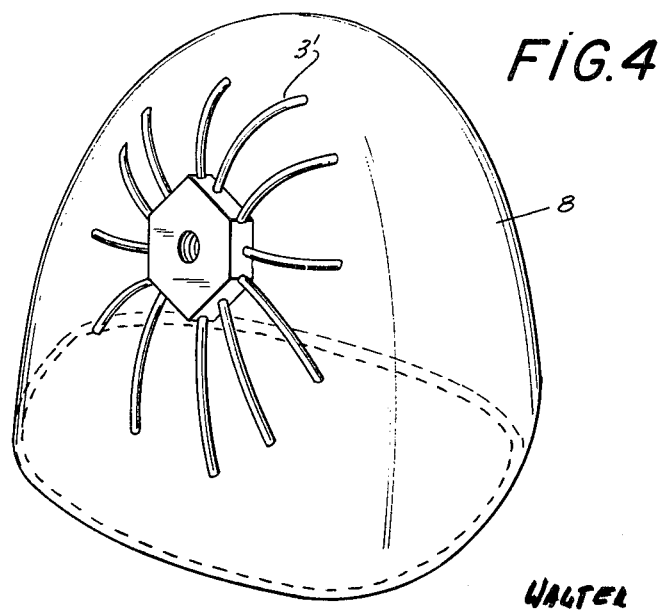
FIG. 4 illustrates a reinforcing structure similar to that shown in FIG. 1 embedded in a synthetic plastic element of different configuration.

The reinforcing structure according to the present invention may not only be embedded in a flat plate as shown in FIG. 1, but also in arcuate, or dome-shaped plate member 8 as shown in FIG. 4 in which a reinforcing structure similar to that shown in FIG. 3 is used but in which the wires 3' are curved according to the curvature of the member 8.

Also, it will be appreciated that the number, the length, the diameter, the material, the direction and the distribution of the projections may be varied in order to comply with a given demand.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptions should and are intended to be comprehended within the meaning and range of equivalence of the following claims.

What is claimed as new and desired to be protected by Letters Patent is set forth in the appended claims:

1. As a novel article of manufacture, an element of synthetic plastic material; a reinforcing structure embedded in said element, and comprising a first portion having a peripheral margin and a plurality of elongated flexible second portions projecting from said margin in stress-transmitting relationship with said first portion; and connecting means for connecting said first portion, and thereby said element in stress-transmitting relationship with an auxiliary element so that stresses entering from the latter into said first portion are uniformly transmitted into said element of synthetic plastic material via said second portions.

2. An article of manufacture as defined in claim 1, wherein said first portion is a substantially disc-shaped metallic member, and wherein said plurality of second portions are substantially rod-shaped metallic projections projecting radially outwardly from the peripheral margin of said substantially disc-shaped metal member.

3. An article of manufacture as defined in claim 2, wherein said substantially rod-shaped projections are connected to said peripheral margin of said substantially disc-shaped member.

4. An article of manufacture as defined in claim 2, wherein said substantially rod-shaped projections are welded to said peripheral margin of said substantially disc-shaped member.

5. An article of manufacture as defined in claim 2, wherein said substantially rod-shaped projections are integral with said peripheral margin of said substantially disc-shaped member.

6. An article of manufacture as defined in claim 2, wherein said substantially rod-shaped projections are coated with a layer of synthetic plastic material.

7. An article of manufacture as defined in claim 6, wherein said layer of synthetic plastic material consists at least in part of phenoxy resin.

8. An article of manufacture as defined in claim 2, wherein said substantially disc-shaped member and said substantially rod-shaped projections are made of steel.

9. An article of manufacture as defined in claim 2, wherein said substantially rod-shaped metallic projections are metallic wires.

10. An article of manufacture as defined in claim 2, wherein said substantially disc-shaped member is provided centrally with a threaded recess, and wherein said connecting means is a screw member threadably received in said recess.

11. An article of manufacture as defined in claim 2, wherein said substantially disc-shaped member is provided centrally with a nut member, and wherein said connecting means is a screw member threadably received in said nut member.

12. An article of manufacture as defined in claim 1, wherein said first portion is a nut member and said peripheral margin constitutes the polygonal circumference of said nut member, and wherein said second portions are metallic wires projecting starwise outwardly from said polygonal circumference of said nut member.

13. An article of manufacture as defined in claim 1, wherein said element of synthetic plastic material is plate-shaped, and wherein said first portion is embedded centrally in said plate-shaped element of synthetic plastic material.

14. An article of manufacture as defined in claim 1, wherein said element of synthetic plastic material is an arcuate plate-shaped member.

* * * * *